United States Patent [19]

Task et al.

[11] 4,398,685
[45] Aug. 16, 1983

[54] AERIAL DAY/NIGHT REFUELING STATIONS

[75] Inventors: Harry L. Task, Dayton, Ohio; John F. Courtright, San Antonio, Tex.; Louis V. Genco, Enon, Ohio

[73] Assignee: The United States of America as represented by the Secretary of the Air Force, Washington, D.C.

[21] Appl. No.: 242,817

[22] Filed: Mar. 11, 1981

[51] Int. Cl.³ .............................................. B64D 39/00
[52] U.S. Cl. ................................ 244/135 A; 244/3.16; 244/161
[58] Field of Search .................. 244/135 A, 3.16, 161; 250/341, 342; 353/28, 84, 13

[56] References Cited

U.S. PATENT DOCUMENTS

| | | | |
|---|---|---|---|
| 3,285,544 | 11/1966 | Chope et al. | 244/135 A |
| 3,679,297 | 7/1972 | Searle et al. | 353/84 |
| 3,709,589 | 1/1973 | Lamb et al. | 353/13 |
| 3,744,893 | 7/1973 | Chandler | 353/84 |
| 3,761,713 | 9/1973 | Merril | 250/341 |
| 3,917,196 | 11/1975 | Pond et al. | 244/135 A |
| 4,150,803 | 4/1979 | Fernandez | 244/135 A |
| 4,158,885 | 6/1979 | Neuberger | 244/135 A |
| 4,160,534 | 7/1979 | White | 244/135 A |
| 4,288,845 | 9/1981 | Finsness et al. | 244/135 A |

Primary Examiner—Trygve M. Blix
Assistant Examiner—Ivy M. Shum
Attorney, Agent, or Firm—Donald J. Singer; Bobby D. Scearce

[57] ABSTRACT

An improved aerial refueling system, suitable for operation under nighttime or other limited visibility conditions, is described, and comprises a tanker aircraft with refueling boom depending rearwardly thereof, a receiver aircraft having a fuel receptacle for interconnection with the boom, means disposed on the tanker for illuminating the receiver aircraft with infrared light during hookup and refueling, infrared sensitive viewing means and an optical imaging device on the tanker through which the boom operator may view the boom and receiver aircraft to guide the boom into position for connection with the receiver aircraft.

2 Claims, 2 Drawing Figures

AERIAL DAY/NIGHT REFUELING STATIONS

RIGHTS OF THE GOVERNMENT

The invention described herein may be manufactured and used by or for the Government of the United States for all governmental purposes without the payment of any royalty.

BACKGROUND OF THE INVENTION

This invention relates generally to systems for aerial refueling operations between a tanker aircraft and a receiver aircraft.

More specifically, this invention relates to a system on the tanker aircraft for improved visibility of the receiver aircraft by the operator of the refueling station within the tanker aircraft during night aerial refueling maneuvers both to visually acquire the receiver aircraft and to engage the fuel line boom of the tanker with the receptacle located on the receiver aircraft.

Conventional methods for performing aerial refueling operations between a tanker aircraft and a receiver aircraft involve the use of a fuel line in the form of a boom extending downwardly and rearwardly from the tanker, means positioned on the boom, controllable from within the tanker, for maneuvering the boom into a position appropriate for coupling with a receiver aircraft, and a coupler at the end of the refueling boom for interconnection with a fuel receptacle on the receiver aircraft.

A receiver aircraft, prior to establishing a suitable position for receiving fuel from the tanker, must first locate the tanker by such means as radar or homing devices as are known in the art. Once the tanker is located, the receiver aircraft then must assume and maintain a position immediately behind and below the tanker within the so-called "refueling envelope", which is defined as that volume of space behind the tanker the allowable limits within which the refueling boom may be maneuvered horizontally and vertically and extended or retracted without imposing undesirable stress on the refueling boom. The receiver aircraft ordinarily must rely on visual contact with the tanker from a point several hundred yards (depending on lighting and weather conditions) from the tanker to the proper position within the refueling envelope. Of particular importance and difficulty are the delicate maneuvers, and the attendant careful coordination between boom operator and receiver aircraft pilot, required at the precise point of hookup and in maintaining the appropriate relative positions of tanker and receiver aircraft during refueling. This operation, although requiring a high degree of skill by the boom operator and receiver aircraft pilot, is relatively routine during daylight and favorable weather conditions, but with existing methods, aerial refueling operations performed at night or under other limited visibility conditions, is extremely difficult and hazardous.

Methods heretofore proposed and/or used for properly positioning a receiver aircraft behind a tanker for refueling at night, and for maintaining that position, include the use of a guidance light display mounted on the aft belly of the tanker aircraft in view of the receiver aircraft to relay to the receiver aircraft pilot information describing his speed and position relative to the tanker and instructions to adjust that speed and position, such as that described in U.S. Pat. No. 4,158,885 to Neuberger. Other proposed methods involve the use of optical or radiation transmitting and sensing devices located in the tanker and receiver aircraft or on the refueling boom for providing relative speed and position information displayed on monitors to the boom operator and receiver aircraft pilot, such as that described in U.S. Pat. No. 3,285,544 to Chope, et al. Still another method involves the use of a bright visible incandescent light mounted on the tail of the tanker to enable the receiver aircraft to locate the tanker and to assume its specific refueling position, and to illuminate the receiver aircraft to the boom operator stationed in the tanker enabling him to maneuver the refueling boom into position for connection with the receiver aircraft.

Inherent in the use of the foregoing described methods for aerial refueling at night or under other limited visibility conditions are certain difficulties severely limiting the usefulness of those methods. First, and most prominently and unavoidably, both the tanker and receiver aircraft are subject to radar detection, and, therefore, any covert aerial refueling operation must be performed with dispatch. Second, the use of homing devices in the tanker and voice communications between tanker and receiver aircraft further compound the problem of detection of the tanker. Third, the use of guidance light displays disclose with accuracy the location of the tanker and, fourth, the use of a bright visible wavelength light on the tanker to illuminate the receiver aircraft discloses the position of both the tanker and the receiver aircraft. Contributing to the foregoing problems, especially as applied to nighttime aerial refueling operations, is that certain aircraft, particularly fighter aircraft, by design and/or camouflage, are difficult to discern to a boom operator stationed in a tanker, and further, conventional lighting on the tail of the tanker and within the refueling station within the tanker, produce glare on the canopy of a receiver aircraft, further impairing the vision of the pilot of the receiver aircraft.

The foregoing problems inherent in aerial refueling operations, particularly as associated with operations at night or under other limited visibility conditions, have been eliminated or significantly lessened in critical importance by the invention described herein, providing a refueling station for a tanker aircraft uniquely provided with means for illuminating a receiver aircraft with infrared light and means enabling the pilot of the receiver aircraft to view the tanker aircraft without interference from glare so as to safely, quickly and accurately maneuver the receiver aircraft into position for interconnection with the boom, with minimum communication between tanker and receiver aircraft. The invention described herein may also be used in conjunction with existing aerial refueling methods to improve the overall performance and efficiency of aerial refueling operations.

Accordingly, it is an object of this invention to provide an improved aerial refueling system.

It is a further object of this invention to provide an improved aerial refueling system for performing refueling operations at night or under other limited visibility conditions.

It is still another object of this invention to provide an improved aerial refueling system for covert nighttime refueling operations.

These and other objects of the invention will become apparent as the description thereof proceeds.

SUMMARY OF THE INVENTION

In accordance with the foregoing principles and objects of the present invention, an improved aerial refueling station suitable for operation under nighttime or other limited visibility conditions is described herein and comprises a tanker aircraft having a fuel line in the form of a boom depending rearwardly thereof, a receiver aircraft having a fuel receptacle for receiving the boom, an infrared light on the tanker for illuminating the receiver aircraft with near infrared light during hookup and refueling, and infrared sensitive viewing means and an optical imaging device on the tanker whereby the boom operator within the tanker, by observing the receiver aircraft and the shadow of the boom cast upon the receiver aircraft, may guide the boom into position for connection with the fuel receptacle on the receiver aircraft.

DESCRIPTION OF THE DRAWINGS

The invention will be more clearly understood from the following detailed description of specific embodiments thereof read in connection with the accompanying drawings wherein.

DETAILED DESCRIPTION

Figure 1:
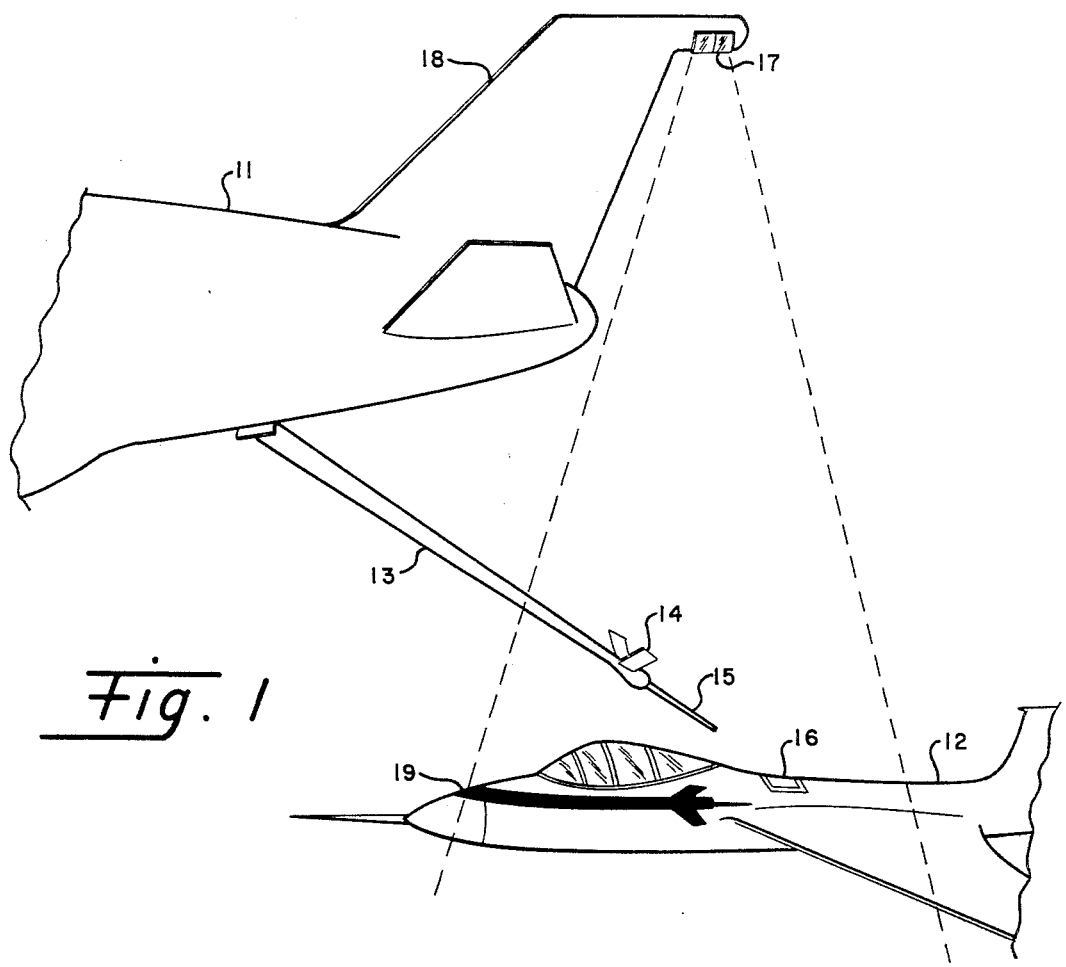
FIG. 1 is a fragmentary illustration of a tanker aircraft and a receiver aircraft near the required relative positions for interconnection of a refueling boom with the receiver aircraft, the tanker being equipped with an illuminating means of this invention.

Referring now to the drawings, FIG. 1 illustrates a tanker aircraft 11 and receiver aircraft 12 near the appropriate relative positions for interconnection of receiver aircraft 12 with a fuel line in the form of boom 13 depending rearwardly of tanker aircraft 11. Boom 13 may be suitably equipped with any conventional aerodynamic control means 14 and extendable probe section 15, each remotely controllable by a boom operator stationed within tanker 11. Receiver aircraft 12 is equipped with a suitable receptacle, such as shown in FIG. 1 as refueling slipway 16, for engaging probe 15 of boom 13 to effect transfer of fuel from tanker 11. Tanker 11 is provided at any appropriate location thereon with an infrared (IR) illuminating means, such as IR light 17, shown in FIG. 1 as positioned on tail assembly 18 of tanker 11. IR light 17 may be positioned at any convenient location on tanker 11 so long as receiver aircraft 12 is illuminated (as illustrated by dashed lines) behind and below tanker 11 so as to cast shadow 19 of boom 13 onto receiver aircraft 12.

Figure 2:
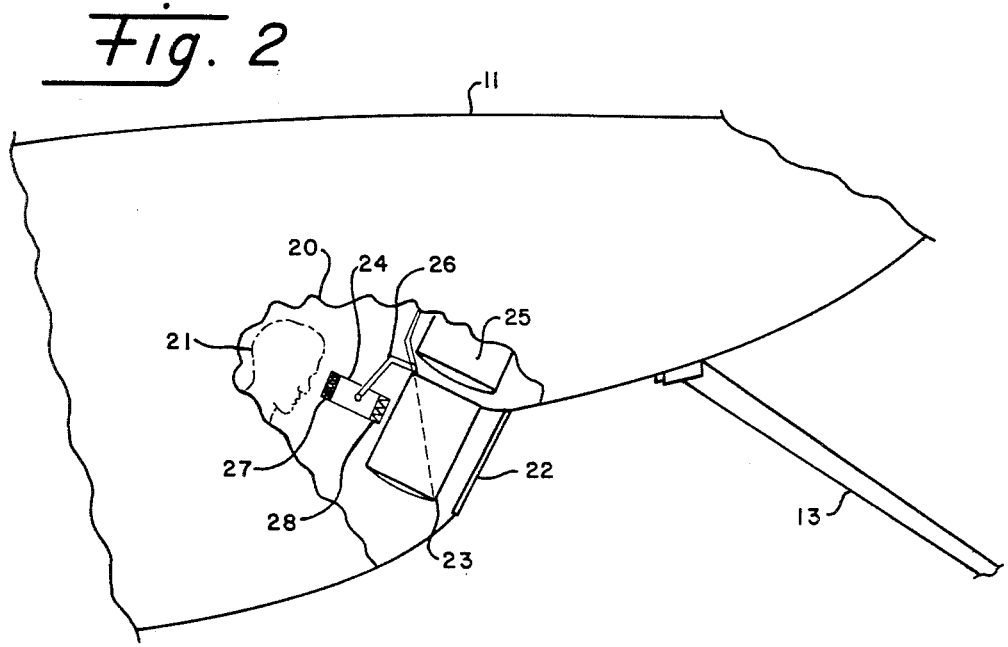
FIG. 2 is a side view of a portion of a refueling station wthin the tanker aircraft illustrating a typical placement of the viewing means of this invention.

Referring now to FIG. 2, a portion of the aft section of tanker 11 is shown in cutaway to reveal the location of refueling station 20 of tanker 11, station 20 being manned by boom operator 21. Station 20 is equipped with any conventional controls (not shown) as are well known in the art, which are operated by boom operator 21 to maneuver boom 13 into position for interconnection of probe 15 with the fuel receptacle on receiver aircraft 12 at fuel slipway 16 as shown in FIG. 1. Boom operator 21 is positioned within refueling station 20 such that he may view boom 13 and receiver aircraft 12 through window 22. Into the line of sight of boom operator 21 may be interposed an optical imaging device such as shown in FIG. 2 as heads-up display (HUD) 23 and near infrared sensitive viewing means such as shown as night vision goggles 24. HUD 23 may be any conventional device providing means through which images of symbology or instrument readings informing boom operator 21 of operational status of the boom 13 are overlaid onto the line of sight of the boom operator 21 through window 22. The readings may be projected onto HUD 23 from such as cathode ray tube 25 which displays information describing operational parameters of boom 13. The symbology imaged onto the field of view of boom operator 21 by HUD 23 may inform boom operator 21 of boom azimuth, elevation, extension, and other operational parameters without impairing his view of boom 13 and receiver aircraft 12.

The night vision goggles 24 comprise suitable optical devices 27 sensitive to visible and near infrared light. Thus, when used under darkened conditions, in conjunction with IR light 17, night vision goggles 24 provide boom operator 21 with a view of receiver aircraft 12 during hookup maneuvers and refueling operations. The night vision goggles 24 may be pivotally mounted in any conventional manner, such as through support 26, so that they may be displaced for routine daylight operations.

Additionally, and in the event that illumination of instruments or controls within station 20 is required to assist boom operator 21 in performing any of his functions, such illumination may be provided within station 20 by a source of electroluminescent blue lighting (not shown in the drawings). Night vision goggles 24 may further comprise a suitable orange (blue blocking) filter 28 for preventing glare of the blue lighting from interfering with the vision of boom operator 24.

During an aerial refueling operation, as by night, a pilot of receiver aircraft 12 locates tanker 11 and positions receiver aircraft 12 within the refueling envelope through any of the conventional means as described above. IR light 17 then illuminates receiver aircraft 12 for boom operator 21 without impairing the vision, as by glare, of the pilot of receiver aircraft 12. As boom 13 is extended, its shadow 19 is cast upon receiver aircraft 12. Boom operator 21, viewing boom 13 and shadow 19 on receiver aircraft 12 through night vision goggles 24 and HUD 23, is able to conveniently guide probe 15 into fuel slipway 16 by observing the convergence of probe 15 with the corresponding portion of shadow 19 at fuel slipway 16.

The present invention, as hereinabove described, therefore provides a unique system for performing aerial refueling operations at night or under other limited visibility conditions, whereby the boom operator with a tanker aircraft may quickly and efficiently effect hookup with a receiver aircraft, and whereby the detectability of the two aircraft has been minimized, particularly as applicable to nighttime covert refueling operations.

It is understood that other embodiments of the present invention may be applied as might occur to one having skill in the field of this invention, and therefore, all such embodiments have not been shown in complete detail. Other such embodiments may be developed without departing from the spirit and scope of this invention.

We claim:
1. An aerial refueling system comprising:
   a. a tanker aircraft having a refueling line depending rearwardly thereof;

b. a receiver aircraft having means thereon for engaging said refueling line;

c. infrared lighting means positioned on said tanker aircraft above said refueling line for illuminating said refueling line and receiver aircraft so as to cast a shadow of said refueling line on said receiver aircraft when said receiver aircraft is in close proximity to said line behind and below said tanker, said shadow serving as an indicia of the distance from said line to said engaging means on said receiver aircraft; and d. infrared sensitive viewing means disposed on said tanker aircraft through which said receiver aircraft, refueling line, and the shadow of said refueling line cast on said receiver aircraft by said infrared lighting means may be simultaneously viewed.

2. The aerial refueling system as recited in claim 1 further comprising an optical imaging means for imaging onto the field of view of said infrared sensitive viewing means symbology describing operational parameters of said aerial refueling system.

* * * * *